US005981461A

United States Patent [19]

Counts et al.

[11] Patent Number: 5,981,461

[45] Date of Patent: Nov. 9, 1999

[54] CLEANING COMPOSITIONS CONTAINING A HALOGEN BLEACHING AGENT AND A SULFOSUCCINATE SALT

[75] Inventors: Michael Wayne Counts, Bethlehem, Pa.; Michael Yao-Chi Chiang, Flemington, N.J.

[73] Assignee: Lonza Inc., Fair Lawn, N.J.

[21] Appl. No.: 09/188,502

[22] Filed: Nov. 9, 1998

Related U.S. Application Data

[63] Continuation of application No. 08/764,310, Dec. 12, 1996, abandoned.

[51] Int. Cl.[6] ................................ C11D 3/00; C11D 7/28; C11D 7/54; C11D 0/00; C09K 3/22

[52] U.S. Cl. .......................... 510/365; 510/215; 510/245; 510/381

[58] Field of Search .................................... 510/365, 381, 510/215, 245

[56] References Cited

U.S. PATENT DOCUMENTS

| | | | |
|---|---|---|---|
| 2,789,078 | 4/1957 | Trusler . | |
| 3,296,069 | 1/1967 | Kowalski . | |
| 4,172,140 | 10/1979 | Shull et al. . | |
| 4,235,599 | 11/1980 | Davis et al. . | |
| 4,320,147 | 3/1982 | Schaeufele . | |
| 4,532,063 | 7/1985 | Gueldenzopf . | |
| 4,560,766 | 12/1985 | Girard et al. . | |
| 4,654,424 | 3/1987 | Girard et al. . | |
| 5,603,941 | 2/1997 | Farina et al. | 424/405 |
| 5,763,386 | 6/1998 | Mondin et al. | 510/417 |

*Primary Examiner*—Yogendra Gupta
*Attorney, Agent, or Firm*—Darby & Darby

[57] ABSTRACT

The present invention relates to cleaning compositions containing one or more halogen bleaching agents and a sulfosuccinate salt. It has been unexpectedly found in accordance with the present invention that the addition of a sulfosuccinate salt to a halogen bleaching agent significantly enhances the cleaning capacity of the halogen bleaching agent compared to the cleaning capacity of either compound alone. The present invention further relates to a method of treating a contaminated surface by washing the contaminated surface with a cleaning composition containing one or more halogen bleaching agents and sulfosuccinate salts. A method of removing soil or oily substances from a substrate by treating the substrate with a cleaning composition containing one or more halogen bleaching agents and sulfosuccinate salts is also provided by this invention.

4 Claims, No Drawings

CLEANING COMPOSITIONS CONTAINING A HALOGEN BLEACHING AGENT AND A SULFOSUCCINATE SALT

This is a continuation of application Ser. No. 08/764,310, filed Dec. 12, 1996, now abandoned.

FIELD OF THE INVENTION

The present invention relates to an improved cleaning composition containing a halogen bleaching agent and a sulfosuccinate salt. A method of treating a contaminated surface and removing soil from a substrate using an improved cleaning composition containing a halogen bleaching agent and a sulfosuccinate salt is also provided by this invention.

BACKGROUND OF THE INVENTION

Halogen bleaching agents such as halohydantoins have been used in a variety of applications, such as dishwashing compositions, toilet bowl cleaning products, and water treatment applications such as swimming pools, cooling water systems, and spas. The use of halogen-releasing agents for bleaching as well as disinfecting purposes is described in the prior art. For example, bromochlorodimethylhydantoin is used to sanitize swimming pools. Dichlorodimethylhydantoin is added to compositions used as a bleaching agent. These compounds are often formed as granules, pellets, flakes, and shaped forms, such as tablets and briquettes.

Various inorganic halogen-based bleaching agents are known including sodium hypochlorite, sodium hypobromite, chlorine and bromine gas, N-chloro and N-bromo compounds. Halogenated hydantoins (also referred to as "halohydantoins") have also been widely used as a bleaching agent in cleaning compositions. Such methods for preparing halogenated hydantoins have been previously described (See, for example, U.S. Pat. No. 4,654,424).

Although halogen-releasing bleaching agents are often found in numerous cleaning and disinfecting products, the cleaning potential of these compounds is somewhat limited. Because these products are widely used, ways of improving the cleaning properties of these compounds are of great importance in this industry.

SUMMARY OF THE INVENTION

It has been unexpectedly found in accordance with the present invention that the addition of a sulfosuccinate salt to a halogen bleaching agent significantly enhances the cleaning capacity of the halogen bleaching agent compared to the cleaning capacity of either compound alone. The present invention relates to an improved cleaning composition containing one or more halogen bleaching agents and sulfosuccinate salts. In a preferred embodiment, the chlorine-containing bleaching agent is a halohydantoin.

The present invention further relates to a method of treating a contaminated surface by washing the contaminated surface with an improved cleaning composition containing one or more halogen bleaching agents and sulfosuccinate salts.

A method of removing soil or oily substances from a substrate by treating the substrate with a cleaning composition of this invention is also provided.

DETAILED DESCRIPTION OF THE INVENTION

The essential components, their relevant proportions, and the reaction conditions of the invention are set forth below.

Unless otherwise indicated, all percentages are on a molar weight basis. All patents, publications and test methods mentioned herein are incorporated by reference.

It has been discovered, in accordance with the present invention, stable, cleaning compositions comprising one or more halogen bleaching agents and sulfosuccinate salts having improved cleaning properties over conventional halogen-releasing cleaning compositions. The halogen bleaching compounds which may be used in the cleaning compositions of the present invention include, for example, chlorine, hypochlorites, hypobromites, and N-chloro and N-bromo compounds such as mono halogenated hydantoins and dihalgenated hydantoins.

In a preferred embodiment, the halogen beaching agent in the cleaning composition is a halohydantoin compound. The halohydantoins described in accordance with the present invention may be prepared as described in U.S. Pat. No. 4,560,766 and have the following structure:

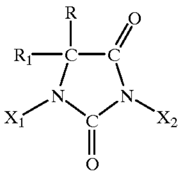

wherein R and $R_1$ are methyl or ethyl and $X_1$ and $X_2$ are chlorine or bromine.

The halogenated hydantoins in the cleaning compositions of this invention, include, but are not limited to, one or more of the following compounds: N-monohalogenated hydantoins such as chlorodimethylhydantoin (MCDMH) and N-bromo-dimethylhydantoin (MBDMH); dihalogenated hydantoins such as dichlorodimethylhydantoin (DCDMH), dibromodimethylhydantoin (DBDMH), and 1-bromo-3-chloro-5,5,-dimethylhydantoin (BCDMH); and halogenated methylethylhydantoins such as chloromethylethylhydantion (MCMEH), dichloromethylethylhydantoin (DCMEH), bromomethylethylhydantoin (MBMEH), dibromomethylethylhydantoin (DBMEH), and bromochloromethylethylhydantoin (BCMEH).

The most preferred halogen bleaching agent is selected from the group consisting of a bleaching agent composition containing approximately eighty percent DCDMH and twenty percent DCMEH ("Dantochlor®") and a bleaching agent composition containing approximately eighty percent BCDMH and twenty percent BCMEM ("Dantobrom®").

In addition to halogen bleaching agents, the cleaning compositions provided by the present invention contain one or more sulfosuccinate salts. The sulfosuccinate salts which may be added to the cleaning composition include, for example, sodium dioctyl sulfosuccinate, disodium lauryl sulfosuccinate, sodium lauryl sulfosuccinate, and sodium lauryl sulfoacetate. In a preferred embodiment, the sulfosuccinate salt is sodium dioctyl sulfosuccinate.

The cleaning compositions of this invention generally contain a halogen bleaching agent having a chlorine or bromine concentration ranging from about 40 ppm to about 1000 ppm and a sulfosuccinate salt having a concentration ranging from about 600 ppm to about 5000 ppm. In a preferred embodiment, the cleaning composition contains a bleaching agent having a chlorine or bromine concentration of about 100 ppm and a sulfosuccinate salt concentration of about 600 ppm.

The cleaning composition of the present invention may generally be formulated to contain a halogen bleaching agent and sulfosuccinate salt in a weight ratio ranging from about 1:2.5 to 1:15, with a molar ratio of about 1:1 being preferred. The cleaning composition may be formulated with or without additional liquid vehicles or disperants, or solid extenders, or inert carrier conventionally used with cleaning formulations.

Generally, the cleaning composition contains at least 100 parts of halogen bleaching agent and at least 600 parts of sulfosuccinate salt per million parts of an aqueous fluid medium. Thus, the halogen bleaching agent may be added in amounts ranging from about 40 ppm to about 120 ppm of a halogen per million parts of an aqueous fluid medium. Likewise, one may suitably add from about 400 to about 2000 parts of sulfosuccinate per million parts of the aqueous fluid medium. In a preferred embodiment, the use dilution comprises about 600 ppm sulfosuccinate salt per million parts of an aqueous fluid medium and about 100 ppm of a halogen per million parts of an aqueous fluid medium.

The present invention further provides a cleaning composition concentrate comprising from about 0.2% to about 5.0% sulfosuccinate salt and from about 0.01% to about 1.0% of a halogen. In a preferred embodiment, the cleaning composition concentrate comprises about 0.6% sulfosuccinate salt and about 0.1% of a halogen.

In a further embodiment, the cleaning compositions may also contain various additives. Examples of additives which may be added to the cleaning compositions of the present invention include, for example, solubility modifiers, compaction aids, fillers, dyes, fragrances, dispersants, lubricants, mold releases, detergent builders, corrosion inhibitors, chelants, stabilizers, biocides, bromide sources, and oxidizing halogen compositions. These additives provide an additional function or serve as a processing aid in the preparation of the particular form. The only requirement is that the material be compatible with the halohydantoin composition.

Any of the additives listed above could be added to the halohydantoins, with solubility modifiers, compaction aids, fillers, fragrance, mold releases, and oxidizing halogen compositions being the most preferred.

Solubility modifiers which may be added to the halohydantoin described herein include, for example, sodium bicarbonate, aluminum hydroxide, magnesium oxide, barium hydroxide, and sodium carbonate. See U.S. Pat. No. 4,537,697. Solubility modifiers may be added to the compositions in an amount ranging from 0.5 to 50% by weight.

Examples of compaction aids include inorganic salts comprised of lithium, sodium, potassium, magnesium and calcium cations associated with carbonate, bicarbonate, borate, silicate, phosphate, percarbonate and perphosphate. See U.S. Pat. No. 4,677,130. Compaction aids may be added to the compositions in an amount ranging from 0.5 to 50% by weight.

Fillers which may be added to the halohydantoins include, for example, inorganic salts, such as combinations of lithium, sodium, potassium, magnesium, and calcium cations with sulfate, and chloride anions, as well as other inorganics such as clays and zeolites. Fillers are generally used in the compositions to reduce product costs and may be added in an amount ranging from 1 to 50% by weight.

Dyes and pigments may be added to the compositions in an amount ranging from 0.1 to 10% by weight. Examples of dyes and pigments are copper phthalocyanine tetrasulfonic acid tetra sodium salt, all derivatized and underivatized phthalocyanines such as Pigment Green 7, Pigment Blue 15, and Pigment Blue 86, as well as inorganic pigments, such as lazurite.

Fragrances may be added to the cleaning compositions in an amount ranging from 0.1 to 10% by weight.

Dispersants may be added to inhibit scale deposition in treated waters in an amount ranging from 0.1 to 20% by weight. Examples of dispersants include all polyacrylate based polymers including secondary and tertiary polymers and some phosphonate dispersants, such as phosphonobutanetricarboxylic acid ("Bayhibit®S") and 2-phosphono-1,2,4-butanetricarboxylic acid tetra-Na salt (PBTC).

Binders which may be added to the halohydantoin include ethylene-bis-stearamide ("Acrawax® C"), magnesium, calcium, and sodium stearate. These binders are generally added to the compositions in an amount ranging from 0.1 to 20% by weight.

Detergent builders may be added to the compositions in order to enhance cleaning performance in an amount generally ranging from 1 to 50% by weight. An example of a detergent builder is sodium tripolyphosphate.

Chelants may be added to the compositions to sequester metal ions and enhance hard water performance and are added in an amount ranging from 1 to 50% by weight. Examples of chelants which may be added include sodium gluconate, ethylene diamine tetraacetic acid (EDTA), citric acid, and sodium nitrilotracetate (NTA).

N-hydrogen stabilizers may be added to the compositions in order to enhance tablet stability and increase additive compatibility, generally in an amount ranging from 0.5 to 20% by weight. Examples of N-hydrogen stabilizers include dimethylhydantoin, 5,5-dimethylhydantoin (DMH), 5,5-ethylmethylhydantoin (EMH), cyanuric acid, sulfamic acid, sulfonamide, sulfamates, glycouril, and succinimide.

Examples of inorganic biocides which may be added to the compositions include molybdates, copper sulfate, selenates, tungstates, and chromates. See U.S. Pat. No. 4,995,987. These biocides are added in an amount ranging from 0.1 to 10% by weight.

Bromide sources may be added to provide biocidal bromide in the presence of active chlorine. Bromide sources may be added in an amount ranging from 1 to 30% by weight. Examples of bromide sources include sodium bromide and potassium bromide.

Oxidizing halogen compositions may be added to optimize product performance by optimizing Br/Cl and DMH/MEH ratios. An example of an oxidizing halogen composition is bromochlorodimethylhydantoin. They are added to the compositions in an amount ranging from 1 to 95% by weight.

The components of the cleaning compositions may be mixed using conventional techniques and formed into various shapes and sizes depending upon the particular use of the cleaning composition as described, for example, in U.S. Pat. No. 4,560,766. For example, the solid cleaning composition may be formed as granules, pellets, flakes and shaped forms, such as tablets and briquettes.

The present invention further provides a method of treating a contaminated surface comprising applying a composition containing a halogen-containing bleaching agent having the formula:

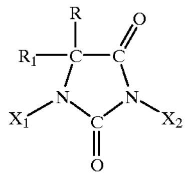

wherein R and $R_1$ is methyl or ethyl and $X_1$ and $X_2$ are chlorine or bromine. The sulfosuccinate salts in the composition used in the method of this invention, include, for example, sodium dioctyl sulfosuccinate, disodium lauryl sulfosuccinate and sodium lauryl sulfosuccinate and sodium lauryl sulfoacetate. In a preferred embodiment, the sulfosuccinate salt is sodium dioctyl sulfosuccinate.

The molar ratio of halogen bleaching agent to sulfosuccinate salt in the compositions used in the method of this invention ranges from approximately 1:1 to approximately 1:2.5. In a preferred embodiment, the molar ratio of halogen bleaching agent to sulfosuccinate salt is 1:1.

A method of removing soil from a substrate comprising treating the substrate with a composition containing from about 40 ppm to about 120 ppm chlorine or bromine and from about 400 ppm to about 2000 ppm sulfosuccinate salt is also described in accordance with this invention. In a preferred embodiment, the cleaning composition used in the method described herein contains about 60 ppm chlorine or bromine and from about 600 ppm to about 1000 ppm sulfosuccinate salt.

To further illustrate the present invention, reference is made to the following examples. It should be understood that the invention is not limited to the specific examples or details described therein. The results obtained from the experiments described in the examples are shown in the accompanying tables.

EXAMPLE I

This example compares the cleaning capacity of the compositions of this invention with the cleaning capacity of the halohydantoin alone and the sulfosuccinate salt alone.

White square ceramic tiles (4½"×4½") were soiled by brushing them with an oily particulate soil. The composition of the oily particulate soil is identified in Table 1 shown below.

TABLE 1

Soil Composition

| Ingredient | Part by weight |
|---|---|
| Diesel Fuel #2 | 10.0 |
| Shell Sol 71 Solvent | 10.0 |
| Light Mineral Oil | 0.5 |
| Carbon Black (Harcros) | 0.1 |
| Metallic Brown Pigment (Harcros B-01085) | 4.9 |
| Bandy Black Clay (Spinks Clay; Paris TN) | 5.0 |
| Motor Oil (10W30) | 0.5 |

The soiled tiles were left standing at room temperature for approximately 1 hour. Subsequently, the tiles were baked in an oven at 100° C. for approximately 30 minutes. The tiles were again left standing at room temperature for approximately 1 hour prior to running the cleaning assay.

After the tiles were properly soiled, they were placed in a pipette washer basket and immersed in a 3000 ml beaker containing 2000 g of deionized water and one of the following four solutions: (i) deionized water (hereinafter "DW") (ii) DW containing a mixture of dichloromethylethylhydantoin (DCMEH) and dichlorodimethylhydantoin (DCDMH) having a chlorine concentration of 100 ppm $Cl_2$, (iii) DW containing 1000 ppm sodium dioctyl sulfosuccinate (hereinafter "SDSS"), or (iv) DW containing 1000 ppm SDSS and a mixture of DCMEH and DCDMH having a chlorine concentration of 100 ppm $Cl_2$. Each soiled tile was immersed in one of the four test solutions shown in Table 2 for approximately 15 hours. The test solutions were stirred with a magnetic stirrer throughout the immersion period. The pH of the compositions tested ranged from approximately 4.5 to 5.5.

Following the immersion period, each tile was rinsed with deionized water and judged by a three person panel. The judges evaluated the percentage of soil removed, by visual inspection, for each tile tested. The judges were asked to evaluate each tile for the percentage of soil removed on a scale of 0 to 100 (with 0 indicating no soil removal and 100 indicating complete soil removal). The percentage of soil removed for each composition tested as determined by each judge (the initials of the judges are shown in the table) is shown in Table 2 below.

TABLE 2

| Breaker | | Percent Soil Removed | | | Average |
|---|---|---|---|---|---|
| No. | Composition | MWC | MFC | DB | $\overline{X}$ |
| 1 | | 8 | 8 | 15 | 10 |
| 2 | DW containing 100 ppm $Cl_2$ | 6 | 2 | 8 | 5 |
| 3 | DW containing 1000 ppm SDSS | 9 | 4 | 4 | .6 |
| 4 | DW containing 100 ppm $Cl_2$ and 1000 ppm SDSS | 40 | 40 | 45 | 40 |

This example shows the synergistic performance found using a cleaning composition containing a halohydantoin and sodium dioctyl sulfosuccinate to clean soiled ceramic tiles in an immersion operation. Approximately 5.0% of the soil on the soiled tiles was removed with a composition containing 100 ppm dichlorohydantoin. In contrast, a cleaning composition containing 100 ppm dichlorohydantoin and 1000 ppm sodium dioctyl sulfosuccinate removed 40% of the soil on the tile. A composition containing the sulfosuccinate salt alone removed only 6% of the soil.

This data demonstrates that the addition of a sulfosuccinate salt to a halohydantoin has a synergistic effect on the cleaning capacity of the halohydantoin, resulting in a superior cleaning composition compared to a cleaning composition containing the halohydantoin without the sulfosuccinate salt.

EXAMPLE II

The assay described in Example I was repeated in this example, except glazed tiles were soiled. The tiles were immersed for approximately 18 hours during the assay. The pH of the compositions tested ranged from 4.0 to 6.0. The results are shown in Table 3 below:

TABLE 3

| Beaker | | Percent Soil Removed | | | Average |
|---|---|---|---|---|---|
| No. | Composition | MZC | MFC | DB | $\overline{X}$ |
| 1 | DW | 15 | 15 | 15 | 15 |
| 2 | DW containing 100 ppm $Cl_2$ | 10 | 10 | 12 | 10 |
| 3 | DW containing 1000 ppm SDSS | 5 | 3 | 7 | 5 |
| 4 | DW containing 100 ppm $Cl_2$ and 1000 ppm SDSS | 60 | 55 | 70 | 60 |

This example shows the synergistic effect using cleaning compositions containing a halohydantoin and sodium dioctyl sulfosuccinate to clean soiled glazed ceramic tiles in the immersion operation described in Example I. Approximately 10% of the soil on the tiles was removed when cleaned with a composition containing 100 ppm dichlorohydantoin. In contrast, when a cleaning composition containing 100 ppm dichlorohydantoin and 1000 ppm sodium dioctyl sulfosuccinate was used to clean the tile, approximately 50% of the soil was removed from the tile. A composition containing the sulfosuccinate salt alone removed 5% of the soil.

Like Example I, the addition of a sulfosuccinate salt to a halohydantoin showed a synergistic effect on the cleaning capacity of the halohydantoin and resulted in a superior cleaning composition compared to a cleaning composition without the sulfosuccinate salt.

EXAMPLE III

The assay described in Example I was repeated in this example, except the immersion time was extended to 115 hours. The compositions tested are described in Table 3. During the immersion period, the system was flushed after 24 and 48 hours with a fresh cleaning solution. The three soils tested in Example II were tested in this assay. The results are shown in Table 3 below:

TABLE 4

| Beaker | | Percent Soil Removed | | | Average |
|---|---|---|---|---|---|
| No. | Composition | MZC | MFC | DB | $\overline{X}$ |
| 1 | DW | 10 | 5 | 7 | 10 |
| 2 | DW containing 100 ppm $Cl_2$ | 10 | 10 | 13 | 10 |
| 3 | DW containing 1000 ppm SDSS | 5 | 5 | 10 | 5 |
| 4 | DW containing 100 ppm $Cl_2$ and 1000 ppm SDSS | 50 | 25 | 65 | 50 |

As shown in this example, a longer immersion period did not affect the cleaning capacity of the cleaning composition of this invention. Like Examples I and II, the addition of a sulfosuccinate salt to a halohydantoin showed a synergistic effect on the cleaning capacity of the halohydantoin and resulted in a superior cleaning composition compared to a cleaning composition without the sulfosuccinate salt (50% compared to 10%).

What is claimed is:

1. A method of cleaning an oily surface comprising applying to said oily surface an aqueous fluid medium composition comprising: (i) from about 40 ppm to about 120 ppm of a halohydantoin having the formula:

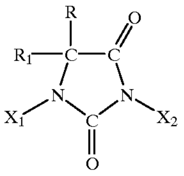

wherein R and $R_1$ is methyl or ethyl and $X_1$ and $X_2$ are chlorine or bromine and (ii) from about 400 ppm to about 2000 ppm of a sulfosuccinate salt and wherein the molar ratio of the halohydantoin to the sulfosuccinate salt ranges from 1:1 to 1:2.5.

2. The method according to claim 1, wherein the sulfosuccinate salt is selected from the group consisting of sodium dioctyl sulfosuccinate, disodium lauryl sulfosuccinate, and sodium lauryl sulfosuccinate.

3. The method according to claim 2, wherein the sulfosuccinate salt is sodium dioctyl sulfosuccinate.

4. The method according to claim 1, wherein the cleaning composition comprises about 60 ppm to about 100 ppm chlorine or bromine moiety of the halohydantoin and from about 600 ppm to about 1000 ppm of the sulfosuccinate salt.

* * * * *